US008735460B2

(12) United States Patent
Knoblock et al.

(10) Patent No.: US 8,735,460 B2
(45) Date of Patent: May 27, 2014

(54) FOAMED ISOCYANATE-BASED POLYMER, A MIX AND PROCESS FOR PRODUCTION THEREOF

(75) Inventors: Kenneth Knoblock, Terre Haute, IN (US); Charles Nichols, Terre Haute, IN (US); James O'Connor, Chesire, CT (US)

(73) Assignee: Dupont Nutrition Bioscience APS, Copenhagen K (DK)

( * ) Notice: Subject to any disclaimer, the term of this patent is extended or adjusted under 35 U.S.C. 154(b) by 313 days.

(21) Appl. No.: 12/351,260

(22) Filed: Jan. 9, 2009

(65) Prior Publication Data
US 2010/0179241 A1    Jul. 15, 2010

(51) Int. Cl.
C08G 18/28    (2006.01)
(52) U.S. Cl.
USPC ......... 521/172; 521/130; 521/163; 521/164; 521/173
(58) Field of Classification Search
USPC ..................... 521/163, 164, 172, 173, 130
See application file for complete search history.

(56) References Cited

U.S. PATENT DOCUMENTS

| | | | |
|---|---|---|---|
| 2,436,967 A | 3/1948 | Leuck | |
| 2,461,139 A | 2/1949 | Caldwell | |
| 2,719,179 A | 9/1955 | Mora et al. | |
| 3,318,868 A | 5/1967 | Kunze | |
| 3,502,601 A * | 3/1970 | Case et al. | 521/172 |
| 3,741,919 A * | 6/1973 | Lewis | 521/169 |
| 3,766,165 A | 10/1973 | Rennhard | |
| 3,932,532 A | 1/1976 | Hunter et al. | |
| 3,956,202 A | 5/1976 | Iwasaki | |
| 4,011,389 A | 3/1977 | Langdon | |
| 4,035,235 A | 7/1977 | Richards et al. | |
| 4,086,279 A | 4/1978 | Langdon et al. | |
| 4,197,372 A | 4/1980 | Hostettler | |
| 4,223,129 A | 9/1980 | Roth et al. | |
| 4,237,182 A | 12/1980 | Fulmer et al. | |
| 4,296,213 A | 10/1981 | Cuscurida et al. | |
| 4,374,209 A | 2/1983 | Rowlands | |
| 4,400,475 A | 8/1983 | Kennedy | |
| 4,404,294 A | 9/1983 | Wiedermann | |
| 4,404,295 A | 9/1983 | Bernstein et al. | |
| 4,417,998 A | 11/1983 | Kennedy | |
| 4,458,034 A | 7/1984 | Fracalossi et al. | |
| RE31,757 E | 12/1984 | Kennedy | |
| 4,517,360 A | 5/1985 | Volpenhein | |
| 4,518,772 A | 5/1985 | Volpenhein | |
| 4,518,778 A | 5/1985 | Cuscurida | |
| 4,520,139 A | 5/1985 | Kennedy | |
| 4,622,233 A | 11/1986 | Torres | |
| 4,654,375 A | 3/1987 | Malwitz | |
| 4,720,544 A | 1/1988 | Schouten | |
| 4,948,596 A | 8/1990 | Bunick et al. | |
| 4,950,743 A | 8/1990 | McCurry, Jr. et al. | |
| 4,956,458 A | 9/1990 | Luo et al. | |
| 4,965,354 A | 10/1990 | Yanaki et al. | |
| 5,051,500 A | 9/1991 | Elmore | |
| 5,091,015 A | 2/1992 | Bunick et al. | |
| 5,292,778 A | 3/1994 | Van Veen et al. | |
| 5,360,845 A | 11/1994 | Billmers et al. | |
| 5,378,491 A | 1/1995 | Stanley et al. | |
| 5,418,301 A | 5/1995 | Hult et al. | |
| 5,424,418 A | 6/1995 | Duflot | |
| 5,573,794 A | 11/1996 | Duflot | |
| 5,585,506 A | 12/1996 | Harvey et al. | |
| 5,589,577 A | 12/1996 | Peltonen et al. | |
| 5,601,863 A | 2/1997 | Borden et al. | |
| 5,620,871 A | 4/1997 | Caboche | |
| 5,645,647 A | 7/1997 | Guzek et al. | |
| 5,667,593 A | 9/1997 | Guzek et al. | |
| 5,672,699 A | 9/1997 | Billmers et al. | |
| 5,681,948 A | 10/1997 | Miller et al. | |
| 5,767,257 A | 6/1998 | Schafermeyer et al. | |
| 5,773,604 A | 6/1998 | Lefevre et al. | |
| 5,840,883 A | 11/1998 | Suzuki et al. | |
| 5,886,161 A | 3/1999 | Oka et al. | |
| 5,945,519 A | 8/1999 | Desai et al. | |
| 5,977,348 A | 11/1999 | Harris et al. | |
| 6,011,092 A | 1/2000 | Seppälä et al. | |
| 6,037,466 A | 3/2000 | Maliczyszyn et al. | |
| 6,080,853 A | 6/2000 | Corrigan et al. | |
| 6,100,391 A | 8/2000 | Gibson et al. | |
| 6,121,440 A | 9/2000 | Kenneally et al. | |
| 6,204,369 B1 | 3/2001 | Roth et al. | |
| 6,303,777 B1 | 10/2001 | Kao et al. | |

(Continued)

FOREIGN PATENT DOCUMENTS

| | | |
|---|---|---|
| EP | 0 289 461 | 11/1988 |
| GB | 1453258 | 10/1976 |

(Continued)

OTHER PUBLICATIONS

Herrington, R. et al., "Chapter 2: Basic Chemistry" *Flexible Polyurethane Foams* (1997).

(Continued)

*Primary Examiner* — John Cooney
(74) *Attorney, Agent, or Firm* — Scully, Scott, Murphy & Presser, P.C.

(57) ABSTRACT

The invention relates to a foamed isocyanate-based polymer derived from a reaction mixture comprising an isocyanate, an active hydrogen-containing compound, a blowing agent and a highly branched polysaccharide which is derivatized with at least two esters of different length. Further the invention relates to a mix and a process for the production of isocyanate-based polymer. The mix for the production of a foamed isocyanate-based polymer comprises a mixture of the derivatized polysaccharide of the invention and an active hydrogen-containing compound. The process for producing a foamed isocyanate-based polymer comprises the steps of: contacting an isocyanate, an active hydrogen-containing compound, the derivatized highly branched polysaccharide of the invention and a blowing agent to form a reaction mixture and expanding the reaction mixture to produce the foamed isocyanate-based polymer. The derivatized highly branched polysaccharide of the invention has an active hydrogen functionality of less than 15 and comprises randomly bonded glucopyranose units, having an average number of 10-100 glucose residues.

55 Claims, No Drawings

(56) References Cited

U.S. PATENT DOCUMENTS

| | | |
|---|---|---|
| 6,455,512 B1 | 9/2002 | Ward |
| 6,475,552 B1 | 11/2002 | Shah et al. |
| 6,495,679 B1 | 12/2002 | Tanaka |
| 6,605,715 B1 | 8/2003 | Lammers et al. |
| 6,620,952 B1 | 9/2003 | Corrigan |
| 6,706,877 B1 | 3/2004 | Claverie et al. |
| 2003/0236315 A1 | 12/2003 | Xie et al. |
| 2003/0236316 A1 | 12/2003 | Heumen et al. |
| 2004/0014829 A1 | 1/2004 | Neff et al. |
| 2006/0122286 A1 | 6/2006 | O'Connor et al. |
| 2006/0122355 A1 | 6/2006 | O'Connor et al. |
| 2006/0241199 A1 | 10/2006 | O'Connor et al. |

FOREIGN PATENT DOCUMENTS

| | | |
|---|---|---|
| JP | 8337628 A | 12/1996 |
| WO | WO 92/12179 A1 | 7/1992 |
| WO | WO 02/10189 A2 | 2/2002 |
| WO | 2006/040333 A1 | 4/2006 |
| WO | 2006-040335 A1 | 4/2006 |

OTHER PUBLICATIONS

Donnelly M. J. et al. "The Conversion of Polysaccharides into Polyurethanes: A Review", Carbohydrate Polymers, 14:221-240 (1991).

International Search Report and Written Opinion for International Application No. PCT/EP2010/050125 dated Nov. 15, 2010.

* cited by examiner

FOAMED ISOCYANATE-BASED POLYMER, A MIX AND PROCESS FOR PRODUCTION THEREOF

The invention relates to a foamed isocyanate-based polymer derived from a reaction mixture comprising an isocyanate, an active hydrogen-containing compound, a blowing agent and a highly branched polysaccharide which has been derivatized with at least two esters of different length. The derivatized polysaccharide has an active hydrogen functionality of less than 15. Further the invention relates to a mix and a process for the production of isocyanate-based polymer.

The mix for the production of a foamed isocyanate-based polymer comprises a mixture of the derivatized polysaccharide and an active hydrogen-containing compound. The process for producing a foamed isocyanate-based polymer comprises the steps of: contacting an isocyanate, an active hydrogen-containing compound, a highly branched polysaccharide and a blowing agent to form a reaction mixture and expanding the reaction mixture to produce the foamed isocyanate-based polymer. The highly branched polysaccharide of the invention comprises randomly bonded glucopyranose units, having an average number of 10-100 glucose residues and the derivatized polysaccharide has an active hydrogen functionality of less than 15.

BACKGROUND OF THE INVENTION

Foamed isocyanate-based polymers are known in the art and one advantage of isocyanate-based polymers compared to other polymer systems is that polymerization and foaming can occur in situ. This results in the ability to mould the polymer while it is forming and expanding. There is however a growing need for development of novel load building techniques for the foams. In order to confer the load building properties normally relatively expensive materials are used and thereto also other properties of the foams could be improved compared to conventionally used techniques.

One of the conventional ways to produce polyurethane foam is known as the "one-shot" technique. In this technique, the isocyanate, a suitable polyol, a catalyst, water (which acts as a reactive "blowing" agent and can optionally be supplemented with one or more physical blowing agents) and other additives are mixed together using, for example, impingement mixing (e.g., high pressure). Generally, if a polyurea is produced, the polyol is replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g., isocyanate moieties and active hydrogen moieties). Typically the prepolymer is produced with an excess of isocyanate groups so all the active hydrogen groups are reacted. To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

Regardless of the technique used, it is known in the art to include a filler material in the reaction mixture. Conventionally, filler materials have been introduced into foamed polymers by loading the filler material into one or both of the liquid isocyanate and the liquid active hydrogen-containing compound (i.e., the polyol in the case of polyurethane, the polyamine in the case of polyurea, etc.). Generally, incorporation of the filler material serves the purpose of conferring so-called load building properties to the resulting foam product.

The nature and relative amounts of filler materials used in the reaction mixture can vary, to a certain extent, depending on the desired physical properties of the foamed polymer product, and limitations imposed by mixing techniques, the stability of the system and equipment imposed limitations (e.g., due to the particle size of the filler material being incompatible with narrow passages, orifices and the like of the equipment).

One known technique of incorporating a solid material in the foam product for the purpose of improving hardness properties involves the use of polyol-solids dispersion, particularly one in the form of a polymer polyol, i.e. a graft copolymer polyol. As is known in the art, graft copolymer polyols (copolymer polyols) are polyols, preferably polyether polyols, which contain other organic polymers. It is known that such graft copolymer polyols are useful to confer hardness (i.e., load building) to the resultant polyurethane foam compared to the use of polyols which have not been modified by incorporating the organic polymers. Within graft copolymer polyols, there are two main categories which may be discussed: (i) chain-growth copolymer polyols, and (ii) step-growth copolymer polyols.

Chain-growth copolymer polyols generally are prepared by free radical polymerization of monomers in a polyol carrier to produce a free radical polymer dispersed in the polyol carrier. Conventionally, the free radical polymer can be based on acrylonitrile or styrene-acrylonitrile (SAN). The solids content of the polyol is typically up to about 60%, usually in the range of from about 15% to about 40%, by weight of the total weight of the composition (i.e., free radical polymer and polyol carrier). Generally, these chain-growth copolymer polyols have a viscosity in the range of from about 1,000 to about 8,000 centipoise. When producing such chain-growth copolymer polyols, it is known to induce grafting of the polyol chains to the free-radical polymer.

Step-growth copolymer polyols generally are characterized as follows: (i) PHD (Polyhamstoff Disperion) polyols, (ii) PIPA (Poly Isocyanate Poly Addition) polyols, and (iii) epoxy dispersion polyols. PHD polyols are dispersions of polyurea particles in conventional polyols and generally are formed by the reaction of a diamine (e.g., hydrazine) with a diisocyanate (e.g., toluene diisocyanate) in the presence of a polyether polyol. The solids content of the PHD polyols is typically up to about 50%, usually in the range of from about 15% to about 40%, by weight of the total weight of the composition (i.e., polyurea particles and polyol carrier). Generally, PHD polyols have a viscosity in the range of from about 2,000 to about 6,000 centipoises. PIPA polyols are similar to PHD polyols but contain polyurethane particles instead of polyurea particles. The polyurethane particles in PIPA polyols are formed in situ by reaction of an isocyanate and alkanolamine (e.g., triethanolamine). The solids content of the PIPA polyols is typically up to about 80%, usually in the range of from about 15% to about 70%, by weight of the total weight of the composition (i.e., polyurethane particles and polyol carrier). Generally, PIPA polyols have a viscosity in the range of from about 4,000 to about 50,000 centipoises. See, for example, U.S. Pat. Nos. 4,374,209 and 5,292,778. Epoxy dispersion polyols are based on dispersions of cured epoxy resins in conventional based polyols. The epoxy particles are purportedly high modulus solids with improved hydrogen bonding characteristics.

Further information regarding useful graft copolymer polyols may be found, for example, in Chapter 2 of "Flexible Polyurethane Foams" by Herrington and Hock (1997) and the references cited therein.

Untreated carbohydrates have been incorporated as direct additives into isocyanate-based polymer foams in two ways—1) as a partial or complete replacement for the polyol component, and 2) as an unreacted additive or filler. The carbohydrate can be introduced into the foam starting materials either as a solution or as a fine solid. When added as a solution, the hydroxyl groups on the carbohydrate can react with the isocyanate component and become chemically incorporated into the structure of the polyurethane. Examples of carbohydrates include certain starches, corn syrup, cellulose, pectin as described in U.S. Pat. No. 4,520,139, mono- and disaccharides as described in U.S. Pat. Nos. RE31,757, 4,400,475, 4,404,294, 4,417,998, oligosaccharides as described in U.S. Pat. No. 4,404,295 and pregelatinized starch as described in U.S. Pat. No. 4,197,372. As a solid dispersion, the carbohydrate may be inert in the polymerization reaction, but is physically incorporated into the foam. The advantage is lower cost and the ability of the carbohydrates to char upon combustion, preventing further burning and/or dripping of the foam and reducing smoke formation as described in U.S. Pat. Nos. 3,956,202, 4,237,182, 4,458,034, 4,520,139, 4,654,375. Starch and cellulose are commonly used for this purpose. The starch or cellulose may also be chemically modified prior to foam formulation as described in U.S. Pat. Nos. 3,956,202 and 4,458,034 and US application 2004/0014829 where compositions of polyether polyols derived from alkoxylated hydrogenated starch hydrolysates (HSH) are used.

Further the use of dendritic macromolecules in isocyanate based foams is described in U.S. Pat. No. 5,418,301, WO 02/10189 and US applications US 2003/0236315 and US 2003/0236316 and the use of highly branched polysaccharides with a higher functionality in isocyanate based foams is described in US applications US 2006/0122286 and US 2006/0241199.

Despite the advances made in the art, there exists a continued need for the development of novel load building techniques. Specifically, many of the prior art approaches discussed hereinabove involve the use of relatively expensive materials (e.g., the graft copolymer polyols described above) which can be complicated to utilize in a commercial size facility. Thus, it would be desirable to have a load building technique which could be conveniently applied to isocyanate-based foams as an alternative to conventional load building techniques. It would be further desirable if the load building technique was relatively inexpensive, load building compounds used had good compability with other parts of the reaction mixture and/or improved other properties of the foam and/or could be incorporated into an existing production scheme without great difficulty.

It should be noted that all documents cited in this text ("herein cited documents") as well as each document or reference cited in each of the herein-cited documents, and all manufacturer's literature, specifications, instructions, product data sheets, material data sheets, and the like, as to the products and processes mentioned in this text, are hereby expressly incorporated herein by reference.

SUMMARY OF THE INVENTION

The present invention relates to a foamed isocyanate-based polymer derived from a reaction mixture comprising an isocyanate, an active hydrogen-containing compound, a blowing agent and a highly branched polysaccharide. The highly branched polysaccharide is derivatized to provide a hydrophobicity which renders it compatible with an active hydrogen-containing compound used in the foamed isocyanate-based polymer of the invention. The polysaccharide comprises randomly bonded glucopyranose units, having an average number of 10-100 glucose residues and the derivatized polysaccharide has an active hydrogen functionality of less than 15. The highly branched polysaccharide used is derivatized with at least two esters of different length.

The invention also relates to a mix for the production of the foamed isocyanate-based polymer. The mix comprises a polyether polyol and a highly branched polysaccharide of randomly bonded glucopyranose units, having an average number of 10-100 glucose residues, wherein said polysaccharide has an active hydrogen functionality of less than 15. The polysaccharide is derivatized with at least two esters of different length.

A process for producing a foamed isocyanate-based polymer is also provided. The process comprises the steps of: contacting an isocyanate, an active hydrogen-containing compound, a blowing agent and a highly branched polysaccharide of randomly bonded glucopyranose units, having an average number of 10-100 glucose residues and an active hydrogen functionality of less than 15, to form a reaction mixture. The reaction mixture is expanded to produce the foamed isocyanate-based polymer. The polysaccharide is derivatized with at least two esters of different length.

One advantage of the present invention is the high degree of OH substitution of the polysaccharide which prevents additional cross-linking in the isocyanate-based foam of the invention. Crosslinking in the foam makes stiffer foams that have poor tensile and tear properties.

In the present invention a desired solubility and/or compatibility with the active hydrogen-containing compound, for example the polyol is received by including a sufficient level of long chain esters in the polysaccharide. A high degree of OH substitution is received by including short chain fatty acid esters to block the reactivity of active hydrogens.

DETAILED DESCRIPTION OF THE INVENTION

The present inventors have surprisingly found that a certain sub-group of derivatized highly branched polysaccharides is particularly compatible with polyol normally used in High-Resiliency (HR) foam systems as well as in conventional foam systems and thus advantageous to confer load building properties of isocyanate-based foams without unwanted lowering of the tensile strength, elongation and tear of the foams and with the necessary 65:25 ratio (sag factor).

The inventors found that in foams containing only a single fatty acid ester, the fatty acid ester tended to produce foams which did not achieve the desired tensile and tear properties defining a HR foam. In the present invention long chain ester components was used to a level sufficient to achieve a desired solubility/compatibility with polyol resins used in the foam systems of the invention. However, in order to get a high degree of OH substitution short chain esters was used to block the reactivity of the active hydrogens of the polysaccharide. A high degree of OH substitution of the polysaccharide of the invention was found to prevent additional cross-linking, which makes stiffer foams that have poor tensile and tear properties.

Accordingly, the present invention discloses the use of a group of derivatized highly branched polysaccharides incorporated in isocyanate-based foams. The derivatized highly branched polysaccharides confer significant load building properties to the foam matrix of the isocyanate-based polymer and may be used for this purpose to partially or fully displace current relatively expensive chemical systems which are used to confer load building characteristics to isocyanate-based polymer foams, such as advantageous load building characteristics in polyurethane formulations.

Moreover, the highly branched polysaccharide of this invention provides for a renewable resource versus traditional styrene acrylonitrile copolymers and dendritic polyols described in the comparative examples, which are more heavily petrochemical based components.

The foamed isocyanate-based polymer of the invention is derived from a reaction mixture comprising an isocyanate, an active hydrogen-containing compound, a blowing agent and a highly branched polysaccharide. It comprises a derivatized highly branched polysaccharide of randomly bonded glucopyranose units having an average number of 10-100 glucose residues. The glycosidic bonds of the polysaccharide may be alpha or beta and may consist of any of the possible combinations, 1,2 to 1,6; 2,1 to 2,6; etc. The derivatized polysaccharide used has an active hydrogen functionality of less than 15, preferably 3 to 12, more preferably 4 to 10 and most preferably 5 to 8. It is derivatized with at least two esters of different length, typically one of the esters is a short chain ester of C2-C4, more preferably C2-C3 and most preferably C2 and another of the esters is a long chain esters of C8-C12, more preferably C9-C11 and most preferably C10.

In a preferred embodiment of the invention the ratio between long and short chain esters is 0.2 to 4, preferably 0.3 to 3, and 0.3 to 1. The total hydroxyl substitution of the polysaccharide of the present invention is preferably more than 70%, more preferably at least 75% or most preferably at least 80%. The ratio of said long and short chain esters in 80% hydroxyl substitution of the polysaccharide of the invention may be 60:20, 40:40, 30:50 or 20:60 and in 90% hydroxyl substitution of the polysaccharide of the invention 50:40, 35:55 or 20:70.

In one preferred embodiment of the invention the derivatized highly branched polysaccharide is added in an amount sufficient to confer load building to said foamed isocyanate-based polymer.

Furthermore the invention relates to a mix for the production of an isocyanate based polymer comprising a mixture of a polyether polyol and a highly branched polysaccharide of randomly bonded glucopyranose units, having an average number of 10-100 glucose residues. The polysaccharide has an active hydrogen functionality of less than 15 and is derivatized with at least two esters of different length. The mix may further comprise a blowing agent, at least one catalyst and at least one surfactant.

In a preferred embodiment the mix comprises 1 to 50%, more preferably 5 to 20%, most preferably 2 to 10% by weight of the derivatized polysaccharide.

Typically a suitable mix may comprise one or more polyether polyols, copolymer polyols, blowing agent(s), catalyst(s), surfactant(s) and additives, for example pigments or fillers or ingredients necessary to achieve a desired property such as flame retardancy, increased durability etc. For instance, the following constituents noted in parts per hundred polyol may be added to the mix: water (1-30), catalyst (1-10), surfactant (1-25), crosslinking agent (0-30) and if desired, an auxiliary blowing agent (0-100).

Moreover, a process for producing a foamed isocyanate-based polymer is provided. The process comprises the steps of: contacting an isocyanate, an active hydrogen-containing compound, a blowing agent and a highly branched polysaccharide to form a reaction mixture; and expanding the reaction mixture to produce the foamed isocyanate-based polymer. The highly branched polysaccharide has randomly bonded glucopyranose units, an average number of 10-100 glucose residues and an active hydrogen functionality of less than 15. Further the polysaccharide is derivatized with at least two esters of different length.

Unless otherwise specified, the terms used in the present specification and claims shall have the following meanings;

The term "highly branched" when used to describe the polysaccharide of the invention refers to a polysaccharide which has at least some doubly or triply branched units. A glucopyranose unit which has three linkages is a doubly branched unit and a unit which has four linkages is a triply branched unit. The area (%) of double and/or triple branches in a linkage analysis of the polysaccharide is preferably 0.5-10%, more preferably 1-7% and most preferably 2-5%. Specific examples of such highly branched polysaccharides comprise polydextrose and a polysaccharide produced from starch in a heat treatment process known as pyroconversion.

The term "functionality" of the highly branched polysaccharide and its derivative is dependent upon the average number of glucose residues and refers to the number active hydroxyl groups per molecule. For the purposes of "functionality," the polysaccharide molecule is defined as low-monomer polysaccharide. Normally in a strict sense functionality refers to the number of isocyanate-reactive hydrogens on molecules in the polyol side of the formulation.

The term "polydextrose" as used herein refers to one example of a highly branched polysaccharide. It includes polymer products of glucose which are prepared from glucose, maltose, oligomers of glucose or hydrolyzates of starch, which are polymerized by heat treatment in a polycondensation reaction in the presence of an acid e.g. Lewis acid, inorganic or organic acid, including monocarboxylic acid, dicarboxylic acid and polycarboxylic acid, such as, but not limited to the products prepared by the processes described in the following U.S. Pat. Nos. 2,436,967, 2,719,179, 4,965,354, 3,766,165, 5,051,500, 5,424,418, 5,378,491, 5,645,647 5,773,604, or 6,475,552, the contents of all of which are incorporated herein by reference.

The term polydextrose also includes those polymer products of glucose prepared by the polycondensation of glucose, maltose, oligomers of glucose or starch hydrolyzates described hereinabove in the presence of a sugar alcohol, e.g. polyol, such as in the reactions described in U.S. Pat. No. 3,766,165. Moreover, the term polydextrose includes the glucose polymers, which have been purified by techniques described in prior art, including any and all of the following but not limited to (a) neutralization of any acid associated therewith by base addition thereto, or by passing a concentrated aqueous solution of the polydextrose through an adsorbent resin, a weakly basic ion exchange resin, a type II strongly basic ion-exchange resin, mixed bed resin comprising a basic ion exchange resin, or a cation exchange resin, as described in U.S. Pat. Nos. 5,667,593 and 5,645,647, the contents of which are incorporated by reference; or (b) decolorizing by contacting the polydextrose with activated carbon or charcoal, by slurrying or by passing the solution through a bed of solid adsorbent or by bleaching with sodium chlorite, hydrogen peroxide and the like; (c) molecular sieving methods, like UF, RO (reverse osmosis), size exclusion, and the like; (d) or enzymatically treated polydextrose or (e) any other recognized techniques known in the art. Among the purification processes used in the art the following may be especially mentioned: bleaching, e.g. using hydrogen peroxide as described in U.S. Pat. No. 4,622,233; membrane technology as described in U.S. Pat. No. 4,956,458; ion exchange e.g. removal of citric acid as described in U.S. Pat. No. 5,645,647 or removal of color/bitter taste as described in U.S. Pat. No. 5,091,015; chromatographic separation, with a strong cation exchanger as described in WO 92/12179; hydrogenation, in combination with ion exchange as described in U.S. Pat. Nos. 5,601,863; 5,573,794 or with ion exchange and chromatographic separation as described in U.S. Pat. No. 5,424,418; or solvent extraction as described in U.S. Pat. No. 4,948,596; EP 289 461, the contents of said patents being incorporated by reference.

Moreover, the term polydextrose includes hydrogenated polydextrose, which, as used herein, includes hydrogenated or reduced polyglucose products prepared by techniques known to one of ordinary skill in the art. Some of the techniques are described in U.S. Pat. Nos. 5,601,863, 5,620,871 and 5,424,418, the contents of which are incorporated by reference. The term polydextrose also encompasses fractionated polydextrose which is a conventional, known material and can be produced e.g. by the processes disclosed in U.S. Pat. Nos. 5,424,418 and 4,948,596 the contents of which are incorporated by reference.

Polydextrose is commercially available from companies such as Danisco Sweeteners, Staley and Shin Dong Bang. Purified forms of polydextrose are marketed by Danisco Sweeteners under the name Litesse® or Litesse® II and by Staley under the name Stalite III. A reduced, i.e. a hydrogenated form of Litesse® is called Litesse® Ultra. The specifications of the Litesse® polydextrose products are available from Danisco Sweeteners.

A further highly branched polysaccharide is derived by pyroconversion from starch. Starch is made of glucose molecules attached by α-(1,4) bonds, with some branching by means of α-(1,6) bonds. The degree of branching depends on the source of the starch. The polysaccharide is produced from starch in a heat treatment process known as pyroconversion. Pyrodextrins are starch hydrolysis products obtained in a dry roasting process either using starch alone or with trace levels of acid catalyst. The first product formed in this reaction is soluble starch, which in turn hydrolyzes further to form dextrins. The molecular weight of the final product depends on the temperature and duration of heating. Transglucosidation can occur in the dextrinization process, in which rupture of an α-(1,4) glucosidic bond is immediately followed by combination of the resultant fragments with neighboring hydroxyl groups to produce new linkages and branched structures. Thus, a portion of the glycosidic bonds are scrambled. A commercially available pyroconverted starch is called Fibersol®-2 and is available from Matsutani America, Inc.

As used throughout this specification, the term "compatible", when used in connection with the solubility characteristics of the derivatized highly branched polysaccharide, is intended to mean that the liquid formed upon mixing the derivatized highly branched polysaccharide and the polyether polyol does not cause precipitation and thus is uniform and stable. Further the formed liquid has a substantially constant light transmittance (transparent at one extreme and opaque at the other extreme) for at least 2 hours, preferably at least 30 days, more preferably a number of months, after production of the mixture. In different embodiments, the stable liquid will be in the form of a clear, homogeneous liquid (e.g., a solution) which will remain as such over time or in the form of an emulsion of the derivatized highly branched polysaccharide in the polyol which will remain as such over time—i.e. the polysaccharide will not settle out over time. The polarity may moreover be reflected by a term known as the solubility parameter (δ), a value which for the very polar water is 23.4 and decreases as one moves to very non polar solvents as methyl t-butyl ether, for which the solubility parameter is 7.4. A polymer with a solubility parameter similar to the solvent will dissolve in it. Components with dramatic differences in solubility parameters, for example water and oil—will not dissolve.

The term "short chain ester" refers to esters having 2 to 4 carbon atoms, preferably 2 to 3 and most preferably 2 carbons. The esters of the invention may include small amounts of impurities for example esters of a different length. The term short chain ester therefore refers to esters used which essentially consist of esters of a certain length (as defined above). The esters may be branched.

The term "long chain ester" refers to esters having 8 to 12 carbon atoms, preferably 9 to 11 and most preferably 10 carbons. The esters of the invention may include small amounts of impurities for example esters of a different length. The term long chain ester therefore refers to esters used which essentially consist of esters of a certain length (as defined above). The esters may be branched.

The term "load building", as used throughout this specification, indicates the ability of the derivatized highly branched polysaccharide to generate firmness in an isocyanate based foam matrix. Typically, foam firmness is described using Indentation Force Deflection (IFD) (previously called Indentation Load Deflection, ILD) or Compressive Force Deflection (CFD) (previously called Compressive Load Deflection, CLD) measured pursuant to ASTM D3574. An IFD number represents the pounds of force required to indent a foam sample by a specified percentage of its original thickness. The CFD values are given in pounds per square inch (psi). The force in pounds needed to compress the sample is recorded and the result is reported in psi by dividing the force by the surface area of the sample. One indication of the resilience of flexible foams is the ratio of indentation deflection or compression measured at two compression depths. Typically this is obtained at 25% and 65% of foam thickness and is expressed as the ratio of the value at 65% divided by the value at 25% (65:25 ratio). A 65:25 ratio greater than 2.4 indicates that the foams can be classified as high resilience foams. A 65:25 ratio below 2.4 indicates a conventional high load bearing foam. The 65:25 ratio may also be referred to as the sag factor or compression modulus. The minimum ASTM D 3770 specifications for a high resilience flexible foam are IFD at 25% deflection <15 psi; Density—1.5 pcf min.; Sag Factor—2.4 min.; Tensile—7 psi min.; Elongation—100% min.; Tear—1 pi min.

The term "index" refers to the ratio of isocyanate groups of the isocyanate and hydroxyl groups of the polyol composition [NCO/OH].

The term "isocyanate-based polymer" is intended to mean, inter alia, polyurethane, polyurea and polyisocyanurate.

In a preferred embodiment the derivatized highly branched polysaccharide of the present invention is used as a partial or total replacement for copolymer polyols in high resilient (HR) molded flexible polyurethane foam applications. High resilient foams are for example used as cushion material, in household furnishings and automobiles. The derivatized highly branched polysaccharide or mix of the invention may also be used as a partial or total replacement for copolymer polyols in carpet underlay and packaging foam applications. Other areas where foams of the invention may be used are in sports equipment, in medicine, for example in artificial skin, implants etc. as well as in all kinds of protection equipment in industry. Foams can be made in slabs and then crushed and/or cut, or they can be molded.

Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted. The isocyanate-based polymer may be formed by the reaction between the mix containing isocyanate-reactive hydrogens, and an isocyanate chosen from the class of readily available isocyanato aromatic compounds.

There are a number of ways to increase the hydrophobic character of the highly branched polysaccharides of the invention. For example, an octenylsuccinylation may be carried out as described in U.S. Pat. Nos. 4,035,235; 5,672,699; or 6,037,466. However, a preferred approach is esterification with a fatty acid, preferably containing 6 to 12 carbon atoms. Methods for esterifying similar structures such as starch are described in U.S. Pat. Nos. 2,461,139; 4,720,544; 5,360,845; 6,455,512; and 6,495,679. Methods for esterifying other polysaccharides are disclosed in U.S. Pat. Nos. 4,517,360; 4,518,772; 5,589,577; 5,840,883; 5,977,348; 6,706,877 and U.S. Patent application 60/619,109.

There are several different synthetic routes described in prior art. Modifying starch with solvents are described in U.S. Pat. Nos. 5,589,577, 5,681,948, 5,840,883 and 6,495,679. Methods for producing alkyl ester derivatives of sucrose, which reactions require no solvent and are carried out under vacuum in the melt are described in U.S. Pat. Nos. 4,517,360, 4,518,772, 5,585,506, 5,681,948, 5,767,257, 5,945,519, 6,080,853, 6,121,440, 6,303,777, 6,620.952 and 6,706,877. Another derivatization procedure described in U.S. Pat. Nos. 4,011,389, 4,223,129, 4,720,544, 4,950,743, 5,886,161, 6,100,391 and 6,204,369 covers the reaction of a long chain alcohol directly with the polysaccharide producing glucoside structure. A process where the same number of hydroxyl groups remains in the final product and where a long chain α olefin epoxide monomer in the presence of base is added to polyols to introduce the desired hydrophobicity is described in U.S. Pat. Nos. 3,932,532 and 4,011,389. Processes where water is present are described in U.S. Pat. Nos. 2,461,139, 3,318,868, 4,720,544, 5,360,845, 6,011,092, 6,455,512 and 6,605,715. A process for modifying carbohydrates which utilizes epichlorohydrin which is reacted with a long chain alcohol in the presence of a Lewis acid catalyst and after neutralization, and were the product is added to a polyglycerol which has been converted to its alkoxide is described in U.S. Pat. No. 4,086,279. Moreover a process for esterification of starch where high boiling solvents such as DMF or DMSO are replaced by supercritical $CO_2$ is described in U.S. Pat. No. 5,977,348.

A particularly straight forward method of derivatizeing the polysaccharide is comprised of the steps of: mixing a highly branched polysaccharide with a suitable ether or aromatic hydrocarbon solvent, such as tetrahydrofuran, diethylene glycol dimethyl ether, xylene or toluene; adding a base, such as NaOH or KOH; and, then a carboxylic acid. The reaction is driven to completion with heat and at the same time removing water.

Alternatively, the hydrophobicity imparting carboxylic acid moiety can be added during or near the completion of the polysaccharide preparation reaction.

As described above the preferred polysaccharide composition utilized in the process for preparing an isocyanate-based polymer and mix of the present invention comprises a derivatized highly branched polysaccharide of randomly bonded glucopyranose units having an average number of 10-100 glucose residues.

In the present invention two or more ester groups of different length are introduced to the polysaccharide whereupon in a preferred embodiment the solubility parameter of the polysaccharide derivatives lowers compared to underivatized and less substituted polysaccharides. When the solubility parameter is below 16, preferably below 14 and more preferably below 12 the modified polysaccharide dissolves in solvents in which underivatized and less substituted polysaccharide is insoluble. The hydrophilicity decreases and therefore the solubility of the polysaccharide derivatives in less polar solvents increases as the degree of substitution increases.

In a preferred embodiment of the invention the isocyanate-based polymer has an Indentation Force Deflection loss when measured pursuant to ASTM D3574 which is less or mainly the same than that of a conventional foam without a load builder. The foamed isocyanate-based polymer and the reference foam have substantially the same density and Compressive Force Deflection when measured pursuant to ASTM D3574.

In another preferred embodiment the preferred foamed isocyanate-based polymer of the invention has a thickness loss when measured pursuant to ASTM D3574 which is less or mainly the same than that of a conventional foam without a load builder. The foamed isocyanate-based polymer and the reference foam have substantially the same density and Compressive Force Deflection when measured pursuant to ASTM D3574.

In a preferred embodiment of the invention the isocyanate is selected from 2,4-toluene diisocyanate, 2,6-toluene diisocyanate and methylene diphenyldiisocyanate and combinations thereof, the active hydrogen-containing compound is a polypropylene oxide containing polyether polyol, the blowing agent is water and said derivatized polysaccharide is a polydextrose. The polydextrose have an active hydrogen functionality of less than 15 and is derivatized with C2 and C10 esters to a hydroxyl substitution of 80%.

In a preferred embodiment where the polysaccharide is derivatized with two ester groups of different length, the weight of ester residues in the derivatized polysaccharide is 40 to 80%, more preferably 45 to 70%, most preferably 45 to 60% based on the weight of the derivatized highly branched polysaccharide.

In one embodiment of the present invention the polysaccharide consists of randomly cross-linked glucose units with all types of glycosidic bonds, containing minor amounts of a bound sugar alcohol and an acid, and having an average molecular weight between about 1,500 and 18,000. The polysaccharide has predominantly 1,6 glycosidic bonds and is a polycondensation product of glucose, maltose or other simple sugars or glucose-containing material such as hydrolyzed starch and a sugar alcohol in the presence of an acid, preferably a carboxylic acid.

Examples of suitable acids include, but are not limited to mono, di or tri carboxylic acids or their potential anhydrides, such as formic, acetic, benzoic, malonic, fumaric, succinic, adipic, itaconic, citric and the like, and/or a mineral acids, such hydrochloric acid, sulfuric acid, sulfurous acid, thiosulfuric acid, dithionic acid, pyrosulfuric acid, selenic acid, selenious acid, phosphorous acid, hypophosphorous acid, pyrophosphoric acid, polyphosphoric acid, hypophosphoric acid, boric acid, perchloric acid, hypochlorous acid, hydrobromic acid, hydriodic acid and silicic acid; acidic alkali metal or alkaline earth metal salts of the above acids such as sodium bisulfate and sodium bisulfite; or mixtures of these acids (and/or acidic alkali or alkaline earth metals salts) with phosphoric acid and the like at about 0.001-3%. The polysaccharide thus produced will contain minor amounts of unreacted sugar alcohol and/or acid and a mixture of anhydroglucoses (reaction intermediates).

In a preferred embodiment the sugar alcohols are selected from the group consisting of sorbitol, glycerol, erythritol, xylitol, mannitol, galactitol or mixtures thereof, typically at a level of 5-20% by weight, preferably 5-15%, more preferably 8-12%.

The polysaccharide formed may be further purified or modified by a variety of chemical and physical methods used alone or in combination. These include, but are not limited to: chemical fractionation, extraction with organic solvents, neutralization with a suitable base, purification by chromatography (such as ion exchange or size exclusion), membrane or molecular filtration, further enzyme treatment, carbon treatment and hydrogenation, which is a specific process of reduction.

In the most preferred embodiment of the invention the polysaccharide is a polycondensation product of glucose, sorbitol and citric acid. The water soluble polysaccharide is produced by reacting glucose with sorbitol (8-12% by weight) in the presence of citric acid (0.01-1% by weight) under anhydrous melt conditions and reduced pressure. The polysaccharide may be purified by ion exchange to produce a form in which the acidity is less than 0.004 meq/gm; referred to as low-acidity polyol. Or, it may be purified by a combination of ion exchange and hydrogenation; referred to as hydrogenated polyol. Upon hydrogenation the reducing saccharides are typically less than 0.3% of the total carbohydrate content. Or, it may be further purified by anion exchange and molecular filtration to reduce acidity and the concentration of monomeric reaction by-products; referred to as low-monomer polyol. A portion of the water used in processing may be removed to achieve the desired moisture content. In the low-acidity and hydrogenated forms the polysaccharide constitutes about 90% of the total carbohydrate content: the remainder consisting of glucose, sorbitol and anhydroglucoses. In the low-monomer form the polysaccharide constitutes 99+% of the total carbohydrate content. In this most preferred embodiment the highly branched polysaccharide is a polydextrose. The water content in all the above mentioned cases may also be adjusted to allow milling as either a coarse or fine powder.

In another embodiment of the invention the polysaccharide has predominantly beta-1,4 linkages and a varying number of glucose residues which are hydrolyzed from starch to form dextrins and subsequently linked to form branched structures. In this embodiment the polysaccharide is preferably pyroconverted starch.

The active hydrogen-containing compound of the invention is selected from the group comprising polyols, polyamines, polyamides, polyimines and polyolamines. In a preferred embodiment the active hydrogen-containing compound comprises a polyol. The polyol comprises a hydroxyl-terminated backbone of a member selected from the group comprising polyether, polyesters, polycarbonate, polydiene and polycaprolactone. The polyol may be selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols and mixtures thereof and from the group comprising adipic acid-ethylene glycol polyester, poly (butylene glycol), poly(propylene glycol) and hydroxyl-terminated polybutadiene.

In a more preferred embodiment the polyol comprises a polyether polyol, which may contain polypropylene oxide and polyethylene oxide either randomly distributed on the backbone or as a block at the end of polyol chain. Further the polyether polyol preferably has a functionality of at least 2. The molecular weight of the polyether polyol is in the range of from about 200 to about 12,000, preferably 2,000 to about 7,000, more preferably 2,000 to 6,000. Further the polyether polyol of the reaction mixture may be the same or different from the polyether polyol of the compability indicating mixture.

In a preferred embodiment the foamed isocyanate-based polymer of the invention is flexible polyurethane foam.

The active hydrogen-containing compound may also be selected from the group comprising a polyamine and a polyalkanolamine, preferably the polyamine is selected from the group comprising primary and secondary amine terminated polyethers. In a preferred embodiment these polyethers have a molecular weight of at least about 230 and a functionality of from about 2 to about 6. In another preferred embodiment the polyether has a molecular weight of at least about 230 and a functionality of from about 1 to about 3.

In a preferred embodiment the foam or the mix of the invention may in addition to the active hydrogen-containing compound and the polysaccharide comprise at least one catalyst and at least one surfactant or these may be used in the process for producing isocyanate-based polymer. Any suitable catalyst and surfactant known in the art may be used to obtain the desired characteristics. The catalyst used in the reaction mixture is a compound capable of catalyzing the polymerization reaction. In a preferred embodiment of the invention the catalyst may be selected from the group consisting of tertiary amines and metallic salts or mixtures thereof. Amine catalysts can include, but are not limited to methyl morpholine, triethylamine, trimethylamine, triethylenediamine and pentamethyldiethylenetriamine. Metallic salts can include, but are not limited to tin or potassium salts such as potassium octoate and potassium acetate. A mixture of catalysts is preferred (e.g. Polycat®5, 33LV, BL11—all produced by Air Products; Jeffcat® ZF10—produced by Huntsman, or Niax® A-1 produced by Momentive Performance Materials). Further, U.S. Pat. Nos. 4,296,213 and 4,518,778 discusses suitable catalyst compounds. In a preferred embodiment of the invention the surfactants may be silicone surfactants used to aid dimensional stability and uniform cell formation. Examples of suitable silicone surfactants are the Dabco® series DC5890, DC 5598, DC5043, DC5357, DC5164—all produced by Air Products Niax® L3184 by Momentive Performance Materials.

The foam, mix or the process of the invention may further comprise at least one blowing agent selected from water, non-water blowing agents, liquid carbon dioxide and combinations thereof. Preferably the blowing agent comprises water. The non-water blowing agents are preferably low-boiling organic liquids, such as acetone, methyl, formate, formic acid, pentane(s), isopentane, n-pentane or cyclopentane, HCFC 141, HFC 245, HFC 365, HFC 134, HFC 227 or a mixture thereof. As is known in the art, water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation. Thus the amount of water may also define the need of isocyanate. If more water is present, the amount of isocyanate needed increases. On the other hand the use of a higher amount of isocyanate may lead to an isocyanate-based polymer foam which is hard and may have a stiff feeling i.e. is "boardy".

Moreover, crosslinking agents, additives like pigments or fillers and other additional components may be added in the foam of the invention, the mix for isocyanate-based polymers or in the process for producing a foamed isocyanate-based polymer. Although, the derivatized highly branched polysaccharide mainly reacts with the isocyanate, in some embodiments of the invention it can also serve as filler. The crosslinking agent may be selected from the group consisting of triethanolamine, glycerin and trimethylol propane. In a preferred embodiment of the invention 1-2% diethanolamine by weight of the mix is added to the mixture.

Special additives, such as fillers, flame retarding agents, crosslinking agents and agents for increased durability may be included. Such additives are preferably added in amounts which are common in the art and thus well known to those skilled in the art. Non-limiting examples of such additives include: surfactants (e.g., organo-silicone compounds available under the tradename L-540 produced by Union Carbide), cell openers (e.g., silicone oils), extenders (e.g., halogenated paraffins commercially available as Cereclor S45), crosslinkers (e.g., low molecular weight reactive hydrogen-containing compositions), pigments/dyes, flame retardants (e.g., halogenated organo-phosphoric acid compounds), inhibitors (e.g., weak acids), nucleating agents (e.g., diazo compounds), anti-oxidants, and plasticizers/stabilizers (e.g., sulphonated aromatic compounds). However, a special filler of the present invention comprises the derivatized highly branched polysaccharide which is included in the foam, the mix or the reaction mixture of the invention.

The isocyanates used in the present invention may come from the class of readily available isocyanato aromatic compounds. Depending upon the desired properties, examples of preferred aromatic isocyanates include 2,4 and 2,6 toluene di-isocyanate (TDI) such as that prepared by the phosgenation of toluene diamine produced by the nitration and subsequent hydrogenation of toluene. The TDI may be a mixture of the 2,4 and 2,6 isomers in ratios of either 80:20 or 65:35 with the more preferred being 80:20 (e.g. TDI 80 produced by Bayer, Dow, Perstorp). Another preferred isocyanate is methylene diphenylisocyanate (MDI) such as prepared by the condensation of aniline and formaldehyde with subsequent phosgenation. The MDI may be a mixture of 2,4' and 4,4'methylene diphenyldiisocyanate as well as a mixture of the 2,4 and 4,4 isomers with compounds having more than two aromatic rings—polymeric-MDI or PMDI (e.g. Lupranate® M20S—produced by BASF, PAPI®27—produced by Dow and Mondur®MR produced by Bayer).

The isocyanate suitable for use in the reaction mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O--$Q^1$--, —CO—, —S—, —S--$Q^1$--S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$CH$_2$O)$_2$, 1-methyl-2,4-diisocyanatocy-cyclohexane, phenylene diisocyanates, tolylene diisocyanates, chlorophenylene diisocyanates, 4,4'-methylene diphenyldiisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q" is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, UK Patent No. 1,453,258, for a discussion of suitable isocyanates. Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-methylene diphenyldiisocyanate, 4,4'-methylene diphenyldiisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane-, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-methylene diphenyldiisocyanate, 4,4'-methylene diphenyldiisocyanate and mixtures thereof. The most preferred isocyanate is a mixture comprising from about 15 to about 25 percent by weight 2,4'-methylene diphenyldiisocyanate and from about 75 to about 85 percent by weight 4,4'-methylene diphenyldiisocyanate. In a preferred embodiment of the invention the isocyanate is selected from the group consisting essentially of (i) 2,4'-methylene diphenyldiisocyanate, 4,4'-methylene diphenyldiisocyanate and mixtures thereof; and (ii) mixtures of (i) with an isocyanate selected from the group comprising 2,4-toluene diisocyanate, 2,6-toluene diisocyanate and mixtures thereof.

The ratio of isocyanate groups of the isocyanate and hydroxyl groups of the polyol is from 1.2:1 to 1:1.2, preferably 1.1:1 to 1:1.1.

The following examples are given to further illustrate the invention and are not intended to limit the scope thereof. Based on the above description a person skilled in the art will be able to modify the invention in many ways to provide isocyanate-based polymers of derivatized polysaccharides with a wide range of defined properties.

EXAMPLES 1-20

Polydextrose Esters of the Invention, Examples 1-7 and Comparative Examples 8-9

The materials in Table 1 were prepared as follows. Dimethylformamide (DMF; 900 ml, except in Example 9 in which DMF was 300 ml), pyridine and polydextrose (PDX; vacuum dried overnight at 60-80° C.) was placed in a 3000 ml 4 necked flask equipped with a top mechanical stirrer, reflux condenser and an addition funnel. The mixture was heated to 40° C. and a clear solution resulted. Next a mixture of decanoyl chloride and where indicated a second acid chloride was added drop-wise over about 45 minutes with cooling. When the addition of the acid chloride(s) was complete, the temperature was raised to 90° C. and then vessel stirred for 1 hour. The resulting warm product was washed several times with a combination of water and/or water with 1% to 2% sodium bicarbonate until the wash water was neutral to pH paper. The wash water was decanted and the product was then placed in a pre-weighed flask and the remaining water was stripped with heat and vacuum in a rotary evaporator. The water content was determined by Karl Fisher titration. The hydroxyl number was determined by ASTM D4274B.

TABLE 1

Polydextrose esters of the invention and comparative polydextrose esters

| | Examples | | | | | | | | |
|---|---|---|---|---|---|---|---|---|---|
| | 1 | 2 | 3 | 4 | 5 | 6 | 7 | 8 | 9 |
| Level of OH Substitution (%) | 80 | 80 | 80 | 80 | 90 | 90 | 90 | 60 | 80 |
| C10:C2 Ratio | 60:20 | 40:40 | 30:50 | 20:60 | 50:40 | 35:55 | 20:70 | 60:0 | 80:0 |
| pyridine (g) | 284 | 320 | 375 | 284 | 316 | 316 | 316 | 214 | 98 |
| PDX (g) | 272 | 306 | 340 | 272 | 272 | 272 | 272 | 204 | 78 |
| decanoyl chloride (g) | 457 | 343 | 286 | 152 | 381 | 267 | 152 | 343 | 175 |
| acetyl chloride (g) | 63 | 141 | 196 | 188 | 126 | 173 | 220 | 0 | 0 |
| Experimental Yield (%) | 97 | 95 | 90 | 79 | 99 | 94 | 82 | 99 | 99 |
| Water (%) | 0.28 | 0.48 | 0.34 | 0.33 | 0.22 | 0.45 | 0.23 | 0.60 | 0.33 |
| Acid # (mg KOH/g) | 28 | 26 | 19 | 15 | 30 | 23 | 12 | 15 | 30 |
| Hydroxyl Number (experimental)* | 139 | 151 | 159 | 164 | 112 | 131 | 152 | 225 | 108 |

*corrected for acid number and water content

Comparative Load Builders, Examples 10 to 11

The load builder of Example 10 was Hyperlite E850, a 43% solids content copolymer (SAN) polyol, commercially available from Bayer. The load builder of Example 11 Boltorn® H311, available from Perstorp is a dendritic polyol containing ~10 wt % water. It has a typical OH-number of 260 mg KOH/g with a molecular weight of 5000 g/mol and functionality 23.

Polydextrose Esters of Examples 12 to 20

The polydextrose esters of Examples 12 to 17 are prepared by the general method described for Examples 1 to 7 using the reagent proportions defined in Table 2. The polydextrose ester of Examples 18 to 20 is prepared as the polydextrose ester of Example 2.

TABLE 2

Reagent proportions for Examples 13-18

| | Examples | | | | | |
|---|---|---|---|---|---|---|
| | 12 | 13 | 14 | 15 | 16 | 17 |
| Level of OH Substitution (%) | 80 | 80 | 80 | 80 | 80 | 90 |
| Long Chain:Short Chain Ratio | 20:60 | 40:40 | 40:40 | 20:60 | 20:60 | 20:70 |
| pyridine (g) | 284 | 284 | 284 | 214 | 214 | 238 |
| PDX (g) | 272 | 272 | 272 | 204 | 204 | 204 |
| octanoyl chloride (g) | 130 | — | — | — | — | — |
| decanoyl chloride | — | 305 | 305 | — | — | 115 |
| Dodecanoyl chloride | — | — | — | 131 | 131 | — |
| acetyl chloride (g) | 188 | — | — | 141 | — | — |
| propanoyl chloride | — | 148 | — | — | 137 | 194 |
| butyroyl chloride | — | — | 170 | — | — | — |
| Experimental Yield (%) | 97 | 96 | 98 | 89 | 93 | 95 |
| Water (%) | 0.30 | 0.24 | 0.28 | 0.46 | 0.34 | 0.31 |
| Acid # (mg KOH/g) | 29 | 18 | 25 | 30 | 20 | 17 |
| Hydroxyl Number (experimental)* | 140 | 132 | 149 | 129 | 143 | 151 |

*corrected for acid number and water content

Polyurethane Foams of Examples 1 to 20

In the foams of Examples 1 to 11, the following materials were used excepted as noted otherwise:
E863, base polyol, commercially available from Bayer
PDX, polydextrose derivatives produced as presented below;
DEAO LF, diethanol amine, a crosslinking agent commercially available from Air Products;
Water, indirect blowing agent;
Dabco 33LV, a gelation catalyst, commercially available from Air Products;
Niax A-1, a blowing catalyst, commercially available from Witco
Dabco BL-11; BL19 blowing catalysts commercial available from Air Products
Niax L-3184 a silicon surfactant manufactured by Momentive Performance Materials
Dabco 5164 a silicon surfactant manufactured by Air Products
Dabco 5043 a silicon surfactant manufactured by Air Products
Lupranate T80, isocyanate (toluene diisocyanate—TDI), commercially available from BASF.

Examples 1 to 11 illustrate the use of a polydextrose derivatives (Examples 1 to 9) or copolymer polyols (Examples 10 to 11), in a typical isocyanate based high resilient (HR) based foam. The polydextrose esters of Examples 1 to 7 were completely compatible in base polyol when used at the concentrations described in foam formulations below at both 10% and 20% on a weight basis. The 20% concentration shows a good compability of the polydextrose ester of the invention also in high amounts.

In each Example, the isocyanate based foams based on the formulations shown in Tables 3 and 4 were prepared by the pre-blending of all resin ingredients including polyols, copolymer polyols (if used), catalysts, water, and surfactants as well as the derivatized highly branched polysaccharide of interest (if used). The isocyanate was excluded from the mixture. The resin blend and isocyanate were combined at indices indicated in Tables 3 and 4 in a cup and mixed using a high-speed dispersator, and then immediately poured into a free rise box mold (approximately 12"×12"×4" for Examples 1-9, and 24"×17"×6" for Examples 10 to 12). The foam was allowed to rise freely at room temperature, cured for 30 minutes at 70° C. and then crushed.

In Examples 1 to 9 a 10% or 20% solution of the highly branched polysaccharide in HR polyol Hyperlite E 863 (base polyol) was prepared in one of two ways. Twenty grams of the highly branched polysaccharide was dissolved in 180 g of acetone and this solution was added to Hyperlite E 863. The acetone was removed on a rotary evaporator leaving a 10% or 20% solution of the highly branched polysaccharide in polyol. For foaming evaluations, these solutions were further diluted to a 5% solution by adding additional Hyperlite E 863. Alternatively the highly branched polysaccharide was accurated weighed into known amount of base polyol and heated to effect dissolution.

Unless otherwise stated, all parts reported in Examples 1 to 11 are in parts by weight.

The results of physical property testing for each foam was the density and Compressive Force Deflection (CFD) at 25% and 65% deflection, measured pursuant to ASTM D3574 Test C for Examples 1 to 9, and Identation Force Deflection (IFD) for the foams of Examples 10 to 11. Both CFD and IFD values are given in pounds per square inch (psi). The force in pounds needed to compress the sample was recorded and the result are reported in psi by dividing the force by the surface area of the sample. Tensile strength, elongation and tear were measured by ASTM D3574 methods D, E, F, respectively.

TABLE 3

The polyurethane foams of Examples 1 to 7

| Ingredient | 1 | 2 | 3 | 4 | 5 | 6 | 7 |
|---|---|---|---|---|---|---|---|
| Level of OH Substitution (%) | 80 | 80 | 80 | 80 | 90 | 90 | 90 |
| C10:C2 Ratio | 60:20 | 40:40 | 30:50 | 20:60 | 50:40 | 35:55 | 20:70 |
| % PDX ester in polyol | 5.0 | 5.0 | 5.0 | 5.0 | 5.0 | 5.0 | 5.0 |
| Hyperlite E 863 (base polyol) | 187.5 | 187.5 | 125.0 | 125.0 | 187.5 | 125.0 | 125.0 |
| Base w/ 10% PDX ester | | | 125.0 | 125.0 | | 125.0 | 125.0 |

TABLE 3-continued

The polyurethane foams of Examples 1 to 7

| Ingredient | 1 | 2 | 3 | 4 | 5 | 6 | 7 |
|---|---|---|---|---|---|---|---|
| Base w/ 20% PDX ester | 62.5 | 62.5 | | | 62.5 | | |
| DEOA | 6.0 | 6.0 | 6.0 | 6.0 | 6.0 | 6.0 | 6.0 |
| water | 9.0 | 9.0 | 9.0 | 9.0 | 9.0 | 9.0 | 9.0 |
| Dabco 33LV | 1.25 | 1.25 | 1.25 | 1.25 | 1.25 | 1.25 | 1.25 |
| Dabco BL-11 | | | | | | | |
| Dabco BL-19 | 0.2 | 0.2 | 0.2 | 0.2 | 0.2 | 0.2 | 0.2 |
| Dabco 5043 | 4.0 | 4.0 | 4.0 | 4.0 | 4.0 | 4.0 | 4.0 |
| Niax 3184 | | | | | | | |
| TDI 80 | 105.5 | 105.6 | 105.8 | 105.9 | 105.5 | 105.3 | 105.7 |
| Index | 1.0 | 1.0 | 1.0 | 1.0 | 1.0 | 1.0 | 1.0 |
| Mix, sec. | 5 | 5 | 5 | 5 | 5 | 5 | 5 |
| Initiation, sec. | 10 | 10 | 10 | 10 | 10 | 10 | 10 |
| Gel, sec. | 55 | 60 | 50 | 55 | 65 | 65 | 60 |
| Rise, sec. | 50 | 50 | 50 | 55 | 60 | 60 | 55 |
| Density (pcf) | 2.27 | 2.19 | 2.30 | 2.28 | 1.90 | 2.18 | 2.11 |
| 25% CFD (psi) | 0.30 | 0.26 | 0.27 | 0.29 | 0.34 | 0.29 | 0.23 |
| 65% CFD (psi) | 0.73 | 0.66 | 0.71 | 0.72 | 1.03 | 0.70 | 0.55 |
| 65:25 ratio | 2.5 | 2.6 | 2.6 | 2.5 | 3.0 | 2.4 | 2.4 |
| Tensile (psi) | 15.4 | 17.3 | 15.7 | 18.7 | 16.1 | 17.2 | 17.9 |
| Elongation, % | 94 | 104 | 107 | 105 | 92 | 103 | 108 |
| Tear (pi) | 0.95 | 1.00 | 1.05 | 1.00 | 1.05 | 1.00 | 1.10 |

TABLE 4

Foams of comparative Examples 8 to 11

| Ingredient | 8 | 9 | 10 | 11 |
|---|---|---|---|---|
| Level of OH Substitution (%), C10 | 60:0 | 80:0 | | |
| % PDX ester in polyol | 5.0 | 5.0 | | |
| Base w/ 10% PDX ester | 50.0 | 50.0 | | |
| Hyperlite E 863 | 50.0 | 50.0 | 944 | 950 |
| Hyperlite E 850 | | | 236 | |
| Boltorn ® H311 | | | | 55 |
| DEOA | 2.7 | 2.7 | 23.6 | 24 |
| water | 3.6 | 3.6 | 46.1 | 34 |
| Dabco 33LV | 0.50 | 0.75 | 3.9 | 3.3 |
| Niax A-1 | | | 0.9 | 0.8 |
| Dabco BL-11 | 0.08 | 0.08 | | |
| Dabco 5164 | | | 11.8 | |
| Dabco 5043 | 1.0 | | | |
| Niax 3184 | | 1.4 | | 10.0 |
| TDI 80 | 46.5 | 46.0 | 552 | 505 |
| Index | 1.0 | 1.0 | 1.0 | 1.0 |
| Mix, sec. | 5 | 5 | 8 | 5 |
| Initiation, sec. | 13 | 8 | 10 | 12 |
| Gel, sec. | 90 | 60 | 60 | — |
| Rise, sec. | 100 | 70 | 75 | — |
| Density (pcf) | 1.83 | 1.67 | 2.02 | 1.95 |
| 25% IFD(psi) | | | 16.1 | 15.7 |
| 65% IFD(psi) | | | 53.8 | 45.5 |
| 25% CFD(psi) | 0.34 | 0.33 | | |
| 65% CFD(psi) | 0.82 | 0.61 | | |
| 65:25 ratio | 2.4 | 1.8 | 3.3 | 2.9 |
| Tensile (psi) | 7.7 | 6.3 | 13.5 | 10.3 |
| Elongation, % | 62 | 55 | 131 | 120 |
| Tear (pi) | 0.98 | 0.69 | 1.2 | 4.1 |

Polyurethane Foams of Examples 12 to 20

In Examples 12 to 20 a 10% or 20% solution of the highly branched polysaccharide in HR polyol Hyperlite E 863 (base polyol) is prepared in one of two ways. Twenty grams of the highly branched polysaccharide is dissolved in 180 g of acetone and this solution is added to Hyperlite E 863. The acetone is removed on a rotary evaporator leaving a 10% or 20% solution of the highly branched polysaccharide in polyol. For foaming evaluations, these solutions are further diluted to a 5% solution by adding additional Hyperlite E 863. Alternatively the highly branched polysaccharide is accurately weighed into known amount of base polyol and heated to effect dissolution.

Unless otherwise stated, all parts reported in Examples 12 to 20 are in parts by weight.

TABLE 5

Polyurethane foams of Examples 12 to 20

| Ingredient | 12 | 13 | 14 | 15 | 16 | 17 | 18 | 19 | 20 |
|---|---|---|---|---|---|---|---|---|---|
| Level of OH Substitution (%) | 80 | 80 | 80 | 80 | 80 | 90 | 80 | 80 | 80 |
| Ester Mix (chain length) | C8/C2 | C10/C3 | C10/C4 | C12/C2 | C12/C3 | C10/C3 | C10/C3 | C10/C2 | C10/C2 |
| Long Chain to Short Chain Ratio | 20:60 | 40:40 | 40:40 | 20:60 | 20:60 | 20:70 | 40:40 | 40:40 | 40:40 |
| % PDX ester in polyol | 5.0 | 5.0 | 5.0 | 5.0 | 5.0 | 5.0 | 2.5 | 7.5 | 10 |
| Hyperlite E 863 (base polyol) | 125.0 | 187.5 | 187.5 | 187.5 | 187.5 | 187.5 | 218.8 | 156.3 | 125 |
| Base w/ 10% PDX ester | 125.0 | | | | | | | | |
| Base w/ 20% PDX ester | | 62.5 | 62.5 | 62.5 | 62.5 | 62.5 | 31.3 | 93.8 | 125 |
| DEOA | 6.0 | 6.0 | 6.0 | 6.0 | 6.0 | 6.0 | 6.0 | 6.0 | 6.0 |
| water | 9.0 | 9.0 | 9.0 | 9.0 | 9.0 | 9.0 | 9.0 | 9.0 | 9.0 |
| Dabco 33LV | 1.25 | 1.25 | 1.25 | 1.25 | 1.25 | 1.25 | 1.25 | 1.25 | 1.25 |
| Dabco BL-19 | 0.2 | 0.2 | 0.2 | 0.2 | 0.2 | 0.2 | 0.2 | 0.2 | 0.2 |

TABLE 5-continued

Polyurethane foams of Examples 12 to 20

| Ingredient | 12 | 13 | 14 | 15 | 16 | 17 | 18 | 19 | 20 |
|---|---|---|---|---|---|---|---|---|---|
| Dabco 5043 | 4.0 | 4.0 | 4.0 | 4.0 | 4.0 | 4.0 | 4.0 | 4.0 | 4.0 |
| Niax 3184 | | | | | | | | | |
| TDI 80 | 105.5 | 105.6 | 105.6 | 105.3 | 105.6 | 105.8 | 104.5 | 106.7 | 108.9 |
| Index | 1.0 | 1.0 | 1.0 | 1.0 | 1.0 | 1.0 | 1.0 | 1.0 | 1.0 |
| Mix, sec. | 5 | 5 | 5 | 5 | 5 | 5 | 5 | 5 | 5 |
| Initiation, sec. | 10 | 10 | 10 | 10 | 10 | 10 | 10 | 10 | 10 |
| Gel, sec. | 60 | 50 | 55 | 65 | 65 | 60 | 65 | 60 | 55 |
| Rise, sec. | 50 | 50 | 55 | 60 | 60 | 55 | 50 | 55 | 50 |
| Density (pcf) | colspan="9" Meets the ASTM requirement for HR foams |
| 25% CFD (psi) | Meets the ASTM requirement for HR foams |
| 65% CFD (psi) | Meets the ASTM requirement for HR foams |
| 65:25 ratio | Meets the ASTM requirement for HR foams |
| Tensile (psi) | Meets the ASTM requirement for HR foams |
| Elongation, % | Meets the ASTM requirement for HR foams |
| Tear (pi) | Meets the ASTM requirement for HR foams |

As can be seen from comparative Examples 8 and 9 compared to Examples 1 to 7 and 13 to 21, a high hydroxyl substitution level as well as at least two esters of different length is needed in order to receive foams of the invention. A lower hydroxyl substitution level, i.e. 60% in Example 8 did not lead to an elongation meeting the standard (min 100%). The foam of Example 8 was stiffer and did not stretch. Moreover, a high hydroxyl substitution level with only one ester, i.e. 80% of C10 ester did not lead to a high resilience flexible foam. The minimum ASTM D 3770 specification for high resilience flexible foam, i.e. the 65:25 ratio of minimum 2.4 was not fulfilled. The sag factor (65:25 ratio) of Example 9 was 1.8.

Compared to the comparative load builders of Examples 10 to 11 the foams of the invention of Examples 1 to 9 had better tensile results.

In order to be commercially interesting for all possible applications, all the ASTM standards for a high resilience flexible foam have to be met. However, in practice isocaynate-based foams for a specific application do not necessary need to meet all ASTM standards. One property may be more important than another for a certain application.

EXAMPLES 21 TO 22

Solubility Test

The derivatized polydextrose esters in Table 6 were prepared by the general method described for Examples 1 to 7 (except that the amount of DMF was 300 ml) using the reagent proportions defined in Table 6.

TABLE 6

PDX ester with 90% OH substitution

| | Example # | |
|---|---|---|
| | 21 | 22 |
| Level of OH Substitution (%) | 90 | 90 |
| C10:C2 Ratio | 45:45 | |
| C10:C8 Ratio | | 45:45 |
| pyridine (g) | 107 | 107 |
| PDX (g) | 68 | 68 |
| decanoyl chloride (g) | 86 | |
| octanoyl chloride (g) | | 73 |
| acetyl chloride (g) | 35 | 35 |
| Experimental Yield (%) | 90 | >90 |
| Water (%) | 0.46 | 0.30 |

TABLE 6-continued

PDX ester with 90% OH substitution

| | Example # | |
|---|---|---|
| | 21 | 22 |
| Acid # (mg KOH/g) | 18 | 12 |
| Hydroxyl Number (experimental)* | 66 | 100 |

*corrected for acid number and water content

The solubility of both modified polydextrose products were checked in the solvents shown in Table 7. In the solubility test about ½ g of polydextrose derivative was mixed with 5 g of the solvent and the sample was mixed at room temperature.

TABLE 7

Solubility Determination of a PDX ester with 90% OH substitution

| | | Solubility Parameter Polydextrose Derivatives | |
|---|---|---|---|
| Solvent | δ | Decyl | Octyl |
| water | 23.4 | | |
| glycerin | 21.1 | | |
| EG | 16.3 | sl soluble* | sl soluble* |
| PG | 14.8 | | |
| methanol | 14.5 | soluble | soluble |
| ethanol | 12.7 | | |
| DMF | 12.1 | | |
| EG monomethyl ether | 12.1 | soluble | soluble |
| EG monoethyl ether | 11.5 | | |
| EG monopropyl ether | 11.1 | soluble | soluble |
| PG monomethyl ether | 11.1 | | |
| DEG monomethyl ether | 10.7 | soluble | soluble |
| DPG monomethyl ether | 10.2 | | |
| EG monobutyl ether | 10.2 | | |
| acetone | 9.9 | soluble | soluble |
| TPG monomethyl ether | 9.8 | | |
| PG mono-t-butyl ether | 9.7 | | |
| DPG-n-propyl ether | 9.6 | | |
| DPG-n-butyl ether | 9.5 | | |
| THF | 9.5 | soluble | soluble |
| toluene | 8.9 | | |
| ethylene dimethyl ether | 8.6 | soluble | soluble |
| dioctyl phthalate | 7.9 | | |
| MTBE | 7.4 | soluble | soluble |

*sl soluble = slightly soluble

As can be seen from table 7 the polydextrose esters used in the foams of the invention were soluble in very polar solvents (methanol) and even soluble in non polar solvents such as methyl t-butylether (MTBE).

While this invention has been described with reference to illustrative embodiments and examples, the description is not intended to be construed in a limiting sense.

Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application is specifically and individually indicated to be incorporated by reference in its entirety.

The invention claimed is:

1. A foamed isocyanate-based polymer derived from a reaction mixture comprising an isocyanate, an active hydrogen-containing compound, a blowing agent and a highly branched polysaccharide of randomly bonded glucopyranose units, having an average number of 10-100 glucose residues wherein said polysaccharide is derivatized with at least two esters of different length and the derivatized polysaccharide has an active hydrogen functionality of 3 to 12, wherein one of said esters is a short chain ester of C2-C4, and wherein one of said esters is a long chain ester of C8-C12.

2. The isocyanate-based polymer of claim 1, wherein said short chain ester is C2-C3.

3. The isocyanate-based polymer of claim 1, wherein said short chain ester is C2.

4. The isocyanate-based polymer of claim 1, wherein said long chain ester is C9-C11.

5. The isocyanate-based polymer of claim 1, wherein said long chain ester is C10.

6. The isocyanate-based polymer of claim 1, wherein the hydroxyl substitution of said derivatized polysaccharide is more than 70%.

7. The isocyanate-based polymer of claim 1, wherein the hydroxyl substitution of said derivatized polysaccharide is at least 75%.

8. The isocyanate-based polymer of claim 1, wherein the hydroxyl substitution of said derivatized polysaccharide is at least 80%.

9. The isocyanate-based polymer of claim 1, wherein the ratio of hydroxyl substitution of said long and short chain esters is 0.2 to 4.

10. The isocyanate-based polymer of claim 1, wherein the ratio of hydroxyl substitution of said long and short chain esters is 0.3 to 3.

11. The isocyanate-based polymer of claim 1, wherein the ratio of hydroxyl substitution of said long and short chain esters is 0.3 to 1.

12. The isocyanate-based polymer of claim 1, wherein said ratio of said long and short chain esters in 80% hydroxyl substitution is 60:20, 40:40, 30:50 or 20:60.

13. The isocyanate-based polymer of claim 1, wherein said ratio of said long and short chain esters in 90% hydroxyl substitution is 50:40, 35:55 or 20:70.

14. The isocyanate-based polymer of claim 4, wherein said derivatized highly branched polysaccharide has an active hydrogen functionality of 4 to 10.

15. The isocyanate-based polymer of claim 4, wherein said derivatized highly branched polysaccharide has an active hydrogen functionality of 5 to 8.

16. The isocyanate-based polymer of claim 1, wherein said derivatized highly branched polysaccharide has a solubility parameter below 16.

17. The isocyanate-based polymer of claim 1, wherein said derivatized highly branched polysaccharide has a solubility parameter below 12.

18. The isocyanate-based polymer of claim 1, wherein the active hydrogen-containing compound is selected from the group comprising polyols, polyamines, polyamides, polyimines and polyolamines.

19. The isocyanate-based polymer of claim 18, wherein the active hydrogen-containing compound comprises a polyol.

20. The isocyanate-based polymer of claim 19, wherein the polyol is a polyether polyol.

21. The isocyanate-based polymer of claim 1, wherein said foamed isocyanate-based polymer is flexible polyurethane foam.

22. The isocyanate-based polymer of claim 19, wherein the ratio of isocyanate groups of said isocyanate and hydroxyl groups of said polyol is from about 1.2:1 to 1:1.2.

23. The isocyanate-based polymer of claim 22, wherein the ratio of isocyanate groups of said isocyanate and hydroxyl groups of said polyol is from about 1.1:1 to 1:1.1.

24. The isocyanate-based polymer of claim 1, wherein said blowing agent is selected from water, non-water blowing agents, liquid carbon dioxide and combinations thereof.

25. The isocyanate-based polymer of claim 24, wherein said non-water blowing agents are low-boiling organic liquids.

26. The isocyanate-based polymer of claim 1, wherein said blowing agent comprises water.

27. The isocyanate-based polymer of claim 1, wherein said reaction mixture further comprises at least one catalyst and at least one surfactant.

28. The isocyanate-based polymer of claim 27 wherein said catalyst is selected from the group consisting of tertiary amines and metallic salts or mixtures thereof.

29. The isocyanate-based polymer of claim 27 wherein said surfactant is selected from the group consisting of silicone surfactants.

30. The isocyanate-based polymer of claim 1 wherein said reaction mixture further comprises crosslinking agents and additives.

31. The isocyanate-based polymer of claim 1, wherein said highly branched polysaccharide which is derivatized is added in an amount sufficient to confer load building to said foamed isocyanate-based polymer.

32. The isocyanate-based polymer of claim 1, wherein said foamed isocyanate-based polymer has an Indentation Force Deflection loss when measured pursuant to ASTM D3574 which is less than that of a reference foam produced by substituting a copolymer polyol for the derivatized highly branched polysaccharide in the reaction mixture, the foamed isocyanate-based polymer and the reference foam having substantially the same density and Compressive Force Deflection when measured pursuant to ASTM D3574.

33. The isocyanate-based polymer of claim 1, wherein said foamed isocyanate-based polymer has thickness loss when measured pursuant to ASTM D3574 which is less than that of a reference foam produced by substituting a copolymer polyol for the derivatized highly branched polysaccharide in the reaction mixture, the foamed isocyanate-based polymer and the reference foam having substantially the same density and Compressive Force Deflection when measured pursuant to ASTM D3574.

34. The isocyanate-based polymer of claim 1, wherein said isocyanate is selected from 2,4-toluene diisocyanate, 2,6- toluene diisocyanate and methylene diphenyldiisocyanate and combinations thereof, the active hydrogen-containing compound is a polypropylene oxide containing polyether polyol, the blowing agent is water and said derivatized polysaccharide is a polydextrose having an active hydrogen functionality of less than 15, derivatized with C2 and C10 esters to a hydroxyl substitution of 80%.

35. A process for producing a foamed isocyanate-based polymer comprising the steps of: contacting an isocyanate, an active hydrogen-containing compound, a blowing agent and a highly branched polysaccharide of randomly bonded glucopyranose units, having an average number of 10-100 glucose residues and an active hydrogen functionality of 3 to 12 to form a reaction mixture; and expanding the reaction mixture to produce the foamed isocyanate-based polymer; wherein said polysaccharide is derivatized with at least two esters of different length, wherein one of said esters is a short chain ester of C2-C4, and wherein one of said esters is a long chain ester of C8-C12.

36. The process of claim 35, wherein said process comprises adding 1 to 50% by weight of said derivatized polysaccharide.

37. The process of claim 35, wherein said process comprises adding 2 to 20% by weight of said derivatized polysaccharide.

38. The process of claim 35, wherein said process comprises adding 2 to 10% by weight of said derivatized polysaccharide.

39. The process of claim 35, wherein said short chain ester is C2-C3.

40. The process of claim 35, wherein said short chain ester is C2.

41. The process of claim 35, wherein said long chain ester is C9-C11.

42. The process of claim 35, wherein said long chain ester is C10.

43. The process of claim 35, wherein the hydroxyl substitution of said polysaccharide is more than 70%.

44. The process of claim 35, wherein the hydroxyl substitution of said polysaccharide is at least 75%.

45. The process of claim 35, wherein the hydroxyl substitution of said polysaccharide is at least 80%.

46. The process of claim 35, wherein the ratio of hydroxyl substitution of said long and short chain esters is 0.2 to 4.

47. The process of claim 35, wherein said derivatized highly branched polysaccharide has a solubility parameter below 16.

48. The process of claim 35, wherein said mix further comprises at least one blowing agent selected from a group consisting of water, non-water blowing agents, liquid carbon dioxide and combinations thereof.

49. The process of claim 35, wherein said mix further comprises at least one catalyst and at least one surfactant.

50. The process of claim 35, wherein said reaction mixture further comprises crosslinking agents and additives.

51. A cushion material for household furnishings and automobiles comprising a foamed isocyanate-based polymer of claim 1 wherein said polymer is derived from a reaction mixture comprising an isocyanate, an active hydrogen-containing compound, a blowing agent and a highly branched polysaccharide of randomly bonded glucopyranose units, having an average number of 10-100 glucose residues and an active hydrogen functionality of 3 to 12 wherein said polysaccharide is derivatized with at least two esters of different length, wherein one of said esters is a short chain ester of C2-C4 and wherein one of said esters is a long chain ester of C8-C12.

52. A carpet underlay comprising a foamed isocyanate-based polymer of claim 1 wherein said polymer is derived from a reaction mixture comprising an isocyanate, an active hydrogen-containing compound, a blowing agent and a highly branched polysaccharide of randomly bonded glucopyranose units, having an average number of 10-100 glucose residues and an active hydrogen functionality of 3 to 12 wherein said polysaccharide is derivatized with at least two esters of different length, wherein one of said esters is a short chain ester of C2-C4 and wherein one of said esters is a long chain ester of C8-C12.

53. A packaging application comprising a foamed isocyanate-based polymer of claim 1 wherein said polymer is derived from a reaction mixture comprising an isocyanate, an active hydrogen-containing compound, a blowing agent and a highly branched polysaccharide of randomly bonded glucopyranose units, having an average number of 10-100 glucose residues and an active hydrogen functionality of 3 to 12 wherein said polysaccharide is derivatized with at least two esters of different length, wherein one of said esters is a short chain ester of C2-C4 and wherein one of said esters is a long chain ester of C8-C12.

54. A method for molding a foamed isocyanate-based polymer which utilizes the foamed isocyanate-based polymer of claim 1 wherein said polymer is derived from a reaction mixture comprising an isocyanate, an active hydrogen-containing compound, a blowing agent and a highly branched polysaccharide of randomly bonded glucopyranose units, having an average number of 10-100 glucose residues and an active hydrogen functionality of 3 to 12 wherein said polysaccharide is derivatized with at least two esters of different length, wherein one of said esters is a short chain ester of C2-C4 and wherein one of said esters is a long chain ester of C8-C12.

55. A method for making alternatively crushed or cut slabs of a foamed isocyanate-based polymer which comprises utilizing the foamed isocyanate-based polymer of claim 1 wherein said polymer is derived from a reaction mixture comprising an isocyanate, an active hydrogen-containing compound, a blowing agent and a highly branched polysaccharide of randomly bonded glucopyranose units, having an average number of 10-100 glucose residues and an active hydrogen functionality of 3 to 12 wherein said polysaccharide is derivatized with at least two esters of different length, wherein one of said esters is a short chain ester of C2-C4 and wherein one of said esters is a long chain ester of C8-C12.

* * * * *

UNITED STATES PATENT AND TRADEMARK OFFICE
CERTIFICATE OF CORRECTION

PATENT NO. : 8,735,460 B2  
APPLICATION NO. : 12/351260  
DATED : May 27, 2014  
INVENTOR(S) : Kenneth Knoblock et al.

Page 1 of 1

It is certified that error appears in the above-identified patent and that said Letters Patent is hereby corrected as shown below:

Title page, item (73)

Should Read:

(73) Assignee: Dupont Nutrition Biosciences APS, Copenhagen K (DK)

Signed and Sealed this  
Sixth Day of January, 2015

Michelle K. Lee  
*Deputy Director of the United States Patent and Trademark Office*